(12) United States Patent
Johnson

(10) Patent No.: US 11,983,425 B2
(45) Date of Patent: May 14, 2024

(54) VEHICULAR COMMUNICATIONS REDUNDANT DATA IDENTIFICATION AND REMOVAL

(71) Applicant: TOYOTA MOTOR ENGINEERING & MANUFACTURING NORTH AMERICA, INC., Plano, TX (US)

(72) Inventor: Miles J. Johnson, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/681,672

(22) Filed: Nov. 12, 2019

(65) Prior Publication Data

US 2021/0141551 A1 May 13, 2021

(51) Int. Cl.
*G06F 3/06* (2006.01)
*H04W 4/40* (2018.01)

(52) U.S. Cl.
CPC .......... *G06F 3/0641* (2013.01); *G06F 3/0604* (2013.01); *G06F 3/0653* (2013.01); *G06F 3/0673* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 8,332,367 B2 | 12/2012 | Bhattacherjee | |
| 8,930,402 B1 * | 1/2015 | Singh | G06F 16/93 |
| | | | 707/784 |
| 9,036,509 B1 * | 5/2015 | Addepalli | H04W 12/03 |
| | | | 701/1 |
| 9,191,342 B2 | 11/2015 | Hughes | |
| 9,547,989 B2 | 1/2017 | Fairfield | |
| 9,697,224 B1 | 7/2017 | Factor | |
| 9,809,159 B1 * | 11/2017 | Snyder | B60T 17/22 |
| 2003/0223055 A1 * | 12/2003 | Agarwal | G01N 21/73 |
| | | | 356/72 |
| 2005/0200479 A1 * | 9/2005 | James | B60Q 1/52 |
| | | | 340/539.18 |
| 2006/0220805 A1 * | 10/2006 | Thomas | B60C 23/0454 |
| | | | 73/146 |
| 2007/0271105 A1 * | 11/2007 | Gunderson | G07C 5/0858 |
| | | | 705/1.1 |
| 2009/0268947 A1 * | 10/2009 | Schaufler | G06K 9/00805 |
| | | | 382/104 |

(Continued)

FOREIGN PATENT DOCUMENTS

CN 106997400 8/2017

*Primary Examiner* — Eric T Loonan
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for data storage for a subject vehicle and include receiving data items at the subject vehicle data from a plurality of data sources and determining whether a data item received from one of the plurality of data sources is redundant with a data item already captured by the subject vehicle. If so, the system eliminates the redundant data item to obtain a nonredundant data set of nonredundant data items and determines whether to store a nonredundant data item of the nonredundant data set based on flow characteristics of the nonredundant data item.

20 Claims, 6 Drawing Sheets

(56) References Cited

U.S. PATENT DOCUMENTS

| | | | |
|---|---|---|---|
| 2012/0021386 A1* | 1/2012 | Anderson | G09B 9/042 |
| | | | 434/66 |
| 2016/0049017 A1* | 2/2016 | Busse | G07C 5/008 |
| | | | 701/33.3 |
| 2016/0094808 A1* | 3/2016 | Cerri | B60R 1/00 |
| | | | 348/36 |
| 2018/0150776 A1 | 5/2018 | Anagnos | |
| 2019/0339416 A1* | 11/2019 | Elkabetz | G01W 1/02 |
| 2020/0192603 A1* | 6/2020 | Tanriover | G06F 3/0659 |
| 2020/0349835 A1* | 11/2020 | Trim | G08G 1/22 |

* cited by examiner

VEHICULAR COMMUNICATIONS REDUNDANT DATA IDENTIFICATION AND REMOVAL

TECHNICAL FIELD

The present disclosure relates generally to vehicular communications, and in particular, some implementations may relate to systems and methods for identifying and removing redundant data for connected vehicle operations based on flow characteristics.

DESCRIPTION OF RELATED ART

With the continued evolution of the connected car and other connected vehicle capabilities, the amount of bandwidth and data storage required for effective vehicle operations and optimization has steadily grown as well. Connected cars and associated applications are continually requiring greater levels of data connection and data transfer to facilitate enhanced operations. Data can be collected from a number of different sources, stored, and communicated off the vehicle. As more vehicles with increased data connectivity requirements are hitting the roadways, communication interfaces are being taxed to their maximum capacity.

BRIEF SUMMARY OF THE DISCLOSURE

Embodiments of the disclosure are directed to identifying and removing redundant data, and specifically vehicle sensor data, to reduce the amount of data that is stored and transferred among vehicles and infrastructure and otherwise handled by the vehicle or elements with which the vehicle communicates. Systems and methods may be implemented to evaluate data gathered from a number of different data sources in different locations to determine whether overlapping data exists, and to remove redundant data or the redundant-data-providing component. The system can also be configured to determine the best place for data to be stored and decide which redundant data item(s) should be removed and which should be maintained. In various embodiments, these operations can be performed on board the vehicle, externally to the vehicle (e.g., in the cloud), or at the vehicle or other data locations.

Additionally, data optimization can be performed based on data flows or data transfer requirements. For example, the system may determine whether it is more efficient to store data on board the vehicle or at the server based on where the data is used most and based on which location might minimize data transfer. In some embodiments, the system can be used to evaluate the data to determine whether changes to a vehicle design are necessary or recommended and inform the new vehicle design.

According to various embodiments of the disclosed technology systems and methods disclosed herein can provide systems and methods for data storage for a subject vehicle that include receiving data items at the subject vehicle data from a plurality of data sources and determining whether a data item received from one of the plurality of data sources is redundant with a data item already captured by the subject vehicle. If so, the system eliminates the redundant data item to obtain a nonredundant data set of nonredundant data items and determines whether to store a nonredundant data item of the nonredundant data set based on flow characteristics of the nonredundant data item.

A method of data storage for a subject vehicle may include: receiving at the subject vehicle data from a plurality of data sources; determining whether a data item received from one of the plurality of data sources is redundant with a data item already captured by the subject vehicle; eliminating the redundant data item to obtain a nonredundant data set of nonredundant data items; and determining whether to store a nonredundant data item of the nonredundant data set based on flow characteristics of the nonredundant data item. A vehicular system for data storage for a subject vehicle may include: a processor; and a memory coupled to the processor to store instructions, which when executed by the processor, cause the processor to perform operations, the operations comprising: receiving at the subject vehicle data from a plurality of data sources; determining whether a data item received from one of the plurality of data sources is redundant with a data item already captured by the subject vehicle; eliminating the redundant data item to obtain a nonredundant data set of nonredundant data items; and determining whether to store a nonredundant data item of the nonredundant data set based on flow characteristics of the nonredundant data item.

The flow characteristics of the nonredundant data item may include at least one of a location where the nonredundant data item is predicted to be used and a predicted flow of the data between the vehicle and locations external to the vehicle. The plurality of data sources may include at least one of vehicle sensors of the subject vehicle, vehicle systems of the subject vehicle and external data sources.

The system and process may further include determining a location to store the nonredundant data item of the nonredundant data set based on the flow characteristics of the nonredundant data item.

In various embodiments, eliminating the redundant data item may further include deleting the redundant data item from storage or not storing the redundant data item on board the vehicle. In other embodiments, eliminating the redundant data item may further include inhibiting the data source from which the redundant data item is received.

A vehicular system for data storage for a subject vehicle may include: a processor; and a memory coupled to the processor to store instructions, which when executed by the processor, cause the processor to perform operations, the operations comprising: receiving at the subject vehicle data from a plurality of data sources; determining whether a data item received from one of the plurality of data sources is redundant with a data item already captured by the subject vehicle; eliminating the redundant data item to obtain a nonredundant data set of nonredundant data items; and determining whether to store a nonredundant data item of the nonredundant data set based on flow characteristics of the nonredundant data item. The flow characteristics of the nonredundant data item may include at least one of a location where the nonredundant data item is predicted to be used and a predicted flow of the data between the vehicle and locations external to the vehicle. The system may further include determining a location to store the nonredundant data item of the non-redundant data set based on the flow characteristics of the nonredundant data item.

The plurality of data sources may include at least one of vehicle sensors of the subject vehicle, vehicle systems of the subject vehicle and external data sources.

Eliminating the redundant data item may further include deleting the redundant data item from storage or not storing the redundant data item on board the vehicle, or inhibiting the data source from which the redundant data item is received.

In various embodiments, a first data item is redundant with a second data item where the first and second data items contain the same data, or where the first and second data items contain different data that leads to a same conclusion.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide systems and methods for data storage for a subject vehicle that include receiving data items at the subject vehicle data from a plurality of data sources and determining whether a data item received from one of the plurality of data sources is redundant with a data item already captured by the subject vehicle. If so, the system eliminates the redundant data item to obtain a nonredundant data set of nonredundant data items and determines whether to store a nonredundant data item of the nonredundant data set based on flow characteristics of the nonredundant data item.

Figure 1:
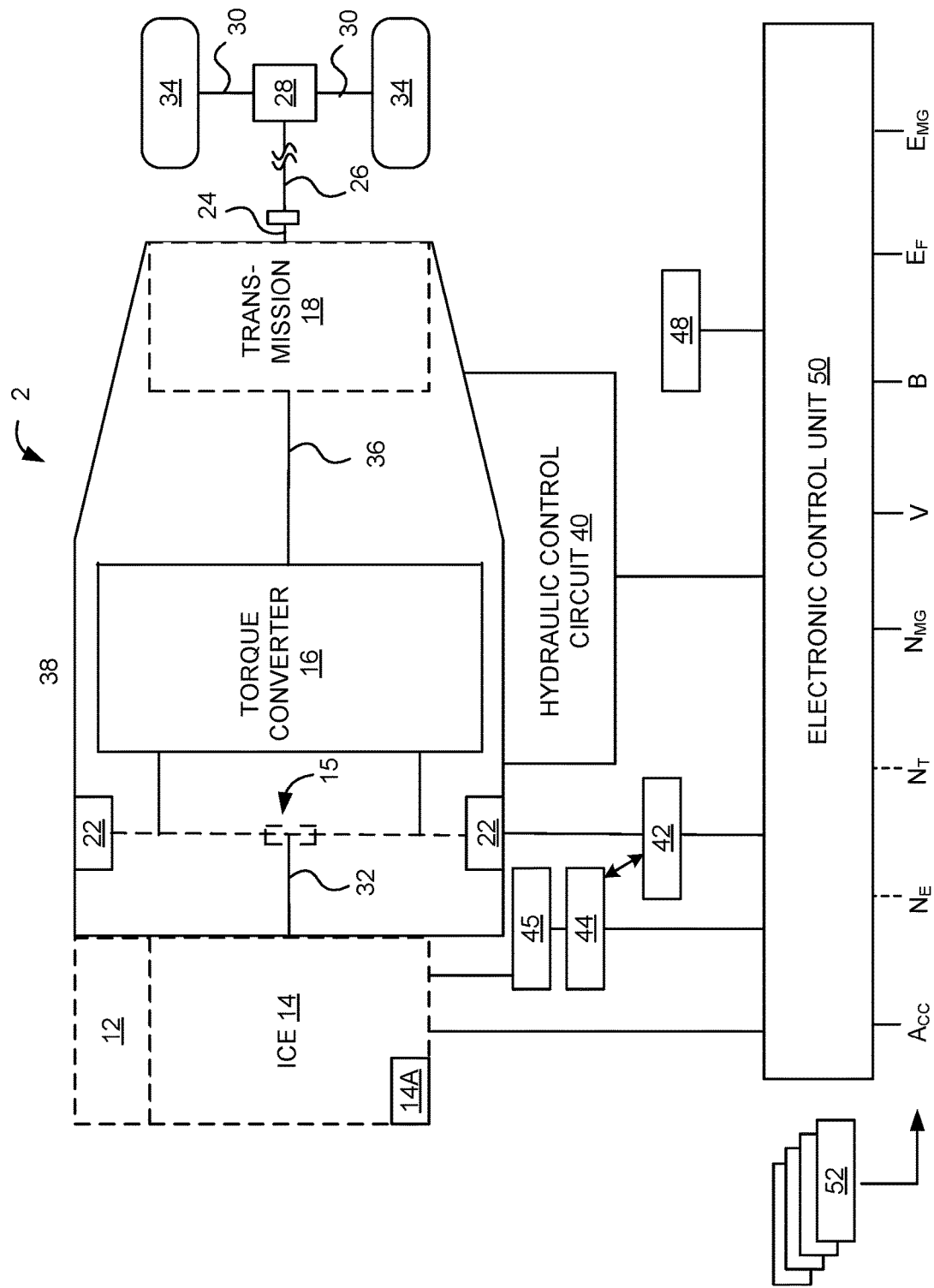
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for addressing data redundancy can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
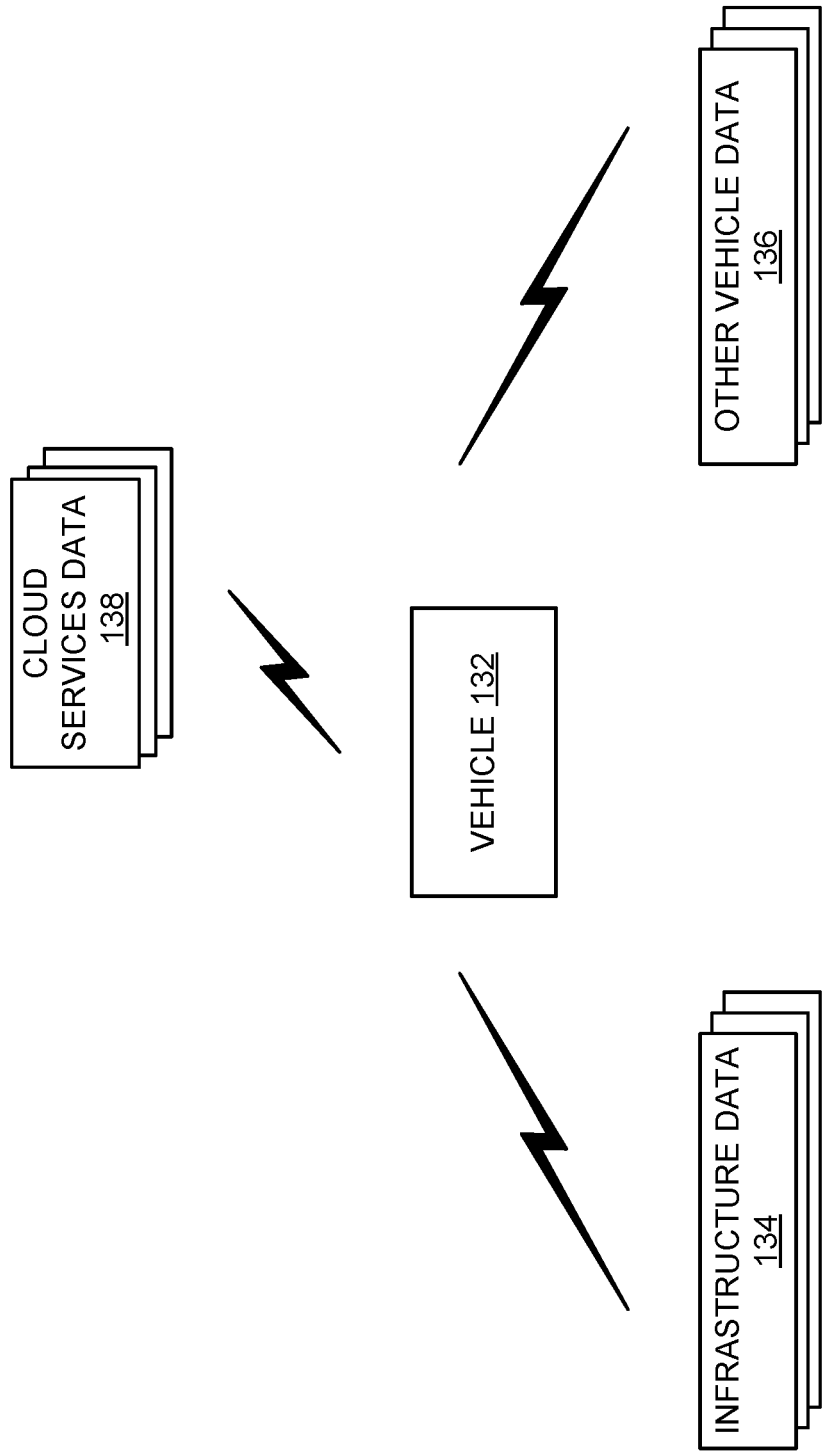
FIG. 2 illustrates an example system overview for redundant data removal in a connected vehicle environment in accordance with one embodiment.

FIG. 2 illustrates an example system overview for redundant data removal in a connected vehicle environment in accordance with one embodiment. As illustrated in the example of FIG. 2, a subject vehicle 132 is communicatively coupled to a number of external elements. The external elements in this example include infrastructure elements of various types that provide infrastructure data 134, and other vehicles that can provide vehicle data 136 to subject vehicle 132. Subject vehicle 132 is also in communicative contact with one or more cloud services entities that can provide various services to subject vehicle 132. In many applications, vehicle 132 may communicate with cloud services 138 (or other external data services provider) using any of a number of different communication protocols such as, for example, LTE and related 4G standards, 5G, UMTS and related 3G standards, and so on.

In the course of operation of subject vehicle 132, systems on board subject vehicle 132 may gather large amounts of data such as infrastructure data 134 and other vehicle data 136. Systems on board subject to 132 may also gather data generated on board such as, for example, data from vehicle sensors and vehicle systems. When operating with external service providers such as cloud services 138, subject vehicle 132 may be required to transfer various of these collected data items to the external services providers, who in turn use this data to perform requested services. Because much of the data received by the vehicle may be redundant, it may be desirable to eliminate or flag the redundant data so that only nonredundant data items are transferred to the external service provider. This can save storage and communication bandwidth requirements, and can lead to reduced power consumption.

Figure 3:
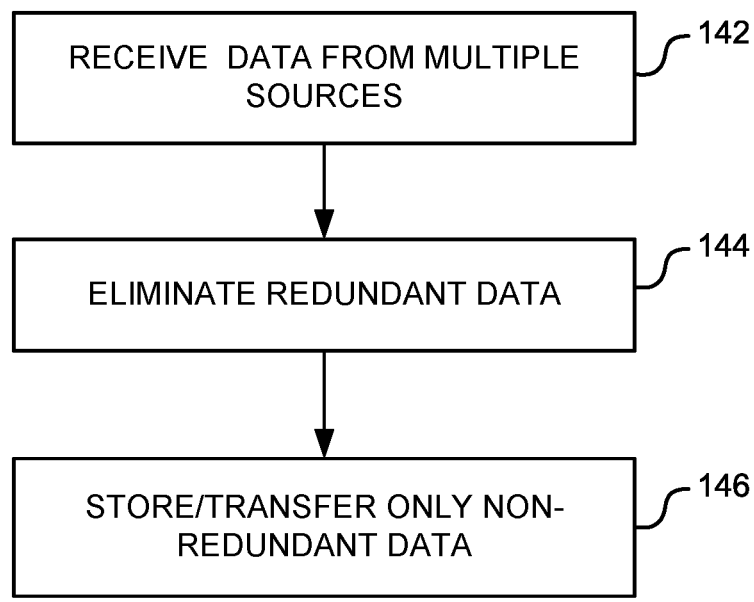
FIG. 3 illustrates an example process for addressing data redundancy in accordance with one embodiment

FIG. 3 illustrates a high level example of limiting redundant data in accordance with one embodiment. With reference to FIG. 3, at operation 142 a subject vehicle (e.g., vehicle 132) receives data from multiple data sources. As described above, the sources can include infrastructure elements, other vehicles, on board sensors and systems, and other data sources.

At operation 144, the system identifies and eliminates redundant data items. In some embodiments, this is done on an ongoing basis as new data items are received. In other embodiments, this elimination can be performed prior to transmitting a block (or other unit) of data to an external entity such as an external service provider. At operation 146, the system stores and transfers only the nonredundant data.

There are a number of scenarios in which this could arise. For example, subject vehicle 132 may receive the same data from multiple different data sources. The system may be configured to check to determine whether the data is consistent, and if the same across multiple sources, the system may elect to store only one instance of the received data. Further to this example, the system may receive traffic information via V2V communications from a large number of different vehicles traveling along a roadway. The subject vehicle may also receive traffic information via infrastructure elements via V2I communications. Each of these vehicles and infrastructure elements may be reporting an accident or other road hazard at a particular location on a route being traveled by those vehicles or monitored by those infrastructure elements. The information each vehicle or infrastructure element reports about the incident, or a subset thereof, may be the same information being reported by some or all of the other vehicles or infrastructure elements in the area.

Rather than store and send to a cloud server or other external entity multiple copies of the same, redundant information from many different vehicles or infrastructure elements, the system may evaluate the received data to determine whether it is the same or different data. If the data is the same, the system may opt to eliminate redundant copies. That is, the system can decide to not store all of the copies of the same data from the various different sources (e.g., it may only store one copy or one copy and a backup copy); and it may decide to store multiple copies of the same data from different sources, but transmit only one copy of the data to an external server depending on the operation being performed by the server. The system may further decide to temporarily or even permanently cease communications with all but one or two (or other quantity) of the multiple data sources to avoid receiving multiple copies of redundant data. This behavior can lead to a dramatic reduction in data storage and communication bandwidth requirements. In some embodiments, where the subject vehicle is receiving communications from multiple other vehicles and information elements, and all these items are sending the same information about the same incident, the vehicle can opt to filter the communications down to communications with one or two (or more) other vehicles or infrastructure elements to avoid being inundated by the same information from multiple different sources. This elimination of redundant sources can be accomplished, for example, by ignoring input from redundant sources, negotiating the communication with redundant sources (e.g., via a MAC protocol) to enable the redundant sources to cease providing redundant data items to the subject vehicle, by disabling communications with redundant data sources, or by other means.

Another example might be vehicle operating parameters. For example, wheel travel sensors, lidar sensors, body roll/pitch/yaw sensors may all provide data indicating that the current road on which the subject vehicle is traveling is in very poor condition. This information may also be reported by other vehicles and infrastructure elements. Other systems of the subject vehicle such as an onboard positioning system may also have this information about the road condition. Before reporting this information up to an external service, the subject vehicle may determine that all of the information elements lead to the same conclusion (e.g., bad roads), and therefore the data items, even if different underlying data, is for these purposes redundant data. Because the underlying data items are unique (e.g., wheel travel, body motion, etc.) each data item may be saved because it might be useful for different purposes. However, where the external service is only interested in road condition, these individual, different data items may still be deemed redundant for this purpose.

At operation 146 the system can be configured to store and transfer only nonredundant data items. As the examples described above illustrate, in some applications only one copy of the redundant data is stored and one copy of the redundant data is transmitted to the external entity. In other applications, some or all of the redundant data items may be stored only some of the redundant data items transmitted to the external entity. As also noted above, in some applications, the system may be configured to cut off communications with redundant data providers to save on data communications bandwidth.

Figure 4:
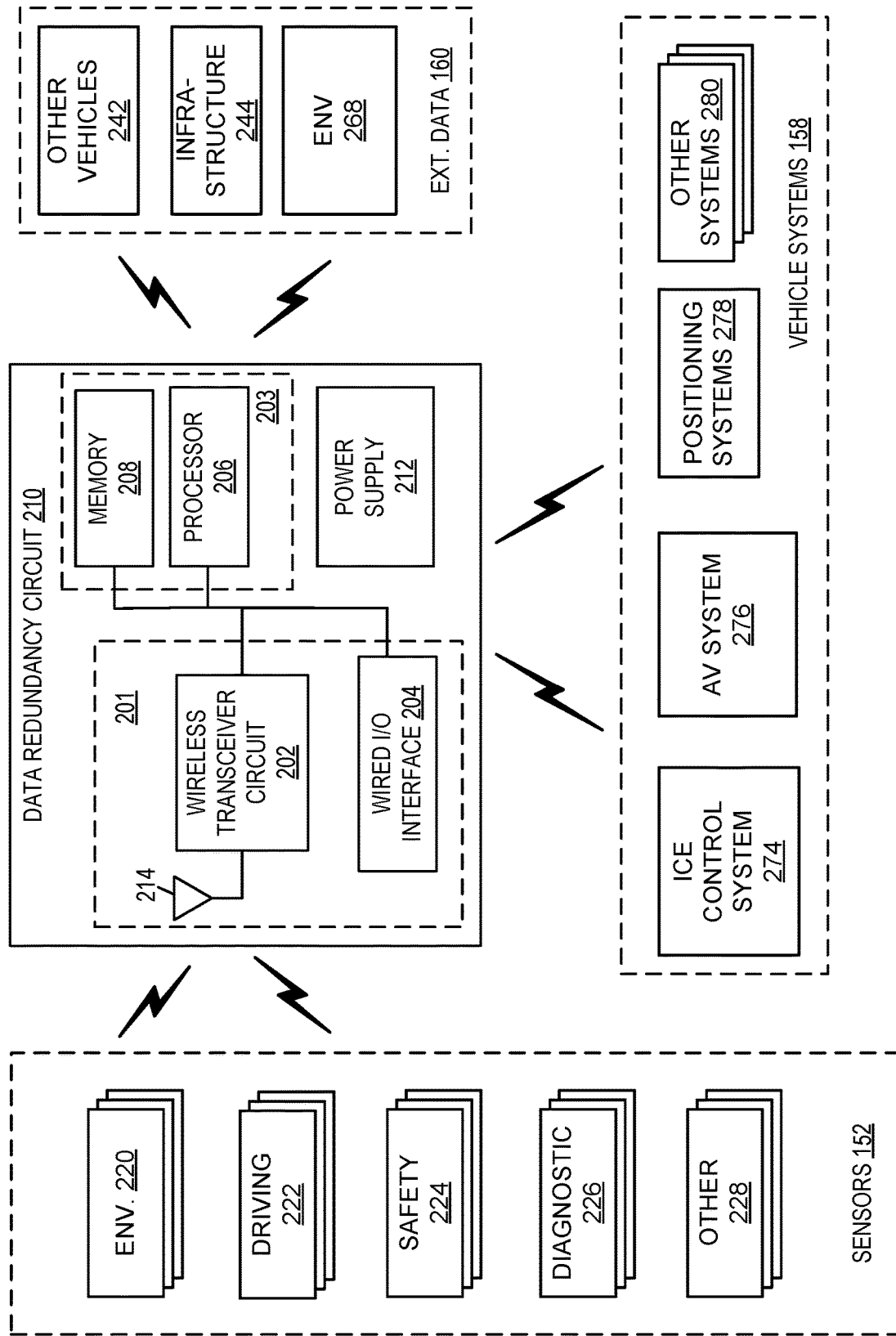
FIG. 4 illustrates an example architecture for addressing data redundancy in accordance with one embodiment.

FIG. 4 illustrates an example architecture for handling data redundancy in accordance with one embodiment of the systems and methods described herein. Referring now to FIG. 4, in this example, the subject vehicle (e.g., vehicle 132) includes a data redundancy circuit 210, a plurality of sensors 152, and a plurality of vehicle systems 158. Sensors 152 and vehicle systems 158 can communicate with data redundancy circuit 210 via a wired or wireless communication interface. Although sensors 152 and vehicle systems 158 are depicted as communicating with data redundancy circuit 210, they can also communicate with each other as well as with other vehicle systems. Data redundancy circuit 210 can be implemented as an ECU or as part of an ECU such as, for example electronic control unit 50. In other embodiments, data redundancy circuit 210 can be implemented independently of the ECU.

Data redundancy circuit 210 in this example includes a communication circuit 201, a decision circuit (including a processor 206 and memory 208 in this example) and a power supply 212. Components of data redundancy circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to data redundancy circuit 210.

Although the example of FIG. 4 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a data redundancy circuit 210.

Communication circuit 201 either or both a wireless transceiver circuit 202 with an associated antenna 214 and a wired I/O interface 204 with an associated hardwired data port (not illustrated). As this example illustrates, communications with data redundancy circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by data redundancy circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and NiH$_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 in this example include environmental sensors 220, driving sensors 222, safety sensors 224, diagnostic sensors 226 and other sensors 228. Environmental sensors 220 can include sensors to monitor data such as cabin sensors, whether sensors, traffic conditions sensors, or other factors affecting the driving environment. Driving sensors 222 can be included to monitor things like driver behavior in other driver monitoring, driver health monitoring, passenger monitoring, driving style monitoring, and so on. Safety sensors 224 can be included to monitor passive and active safety systems on the subject vehicle. Diagnostic sensors 226 can be included to measure diagnostic data including data from the powertrain, chassis, body, electrical components, and other vehicle components or systems. Other sensors 228 can be included to monitor any of a number of different vehicle parameters for the subject vehicle and for surrounding vehicles.

Vehicle systems 158 can include any of a number of different vehicle components or subsystems used to control or monitor various aspects of the vehicle and its performance. In this example, the vehicle systems 158 include an internal combustion engine control system 274, autonomous vehicle systems 276, GPS or other vehicle positioning system 278 and other vehicle systems 280.

External data 160 can include data from a variety of external data sources such as, for example, other vehicles 242, infrastructure elements 244 and environmental elements 268. For example, other vehicles 242 can send information to the subject vehicle using a V2V or other inter-vehicle communications interface. Vehicles can share a number of different During operation, data redundancy circuit 210 can receive information from various vehicle sensors, vehicle systems 158, and external data sources 160 and evaluate the data to determine whether there is redundant data among the data received from the various sources. For example, data redundancy circuit 210 can compare the data received from the plurality of sources to determine whether the same date is being received. Communication circuit 201 can be used to transmit and receive information between data redundancy circuit 210 and sensors 152, and data redundancy circuit 210 and vehicle systems 158. Also, sensors 152 may communicate with vehicle systems 158 directly or indirectly (e.g., via communication circuit 201 or otherwise).

Figure 5:
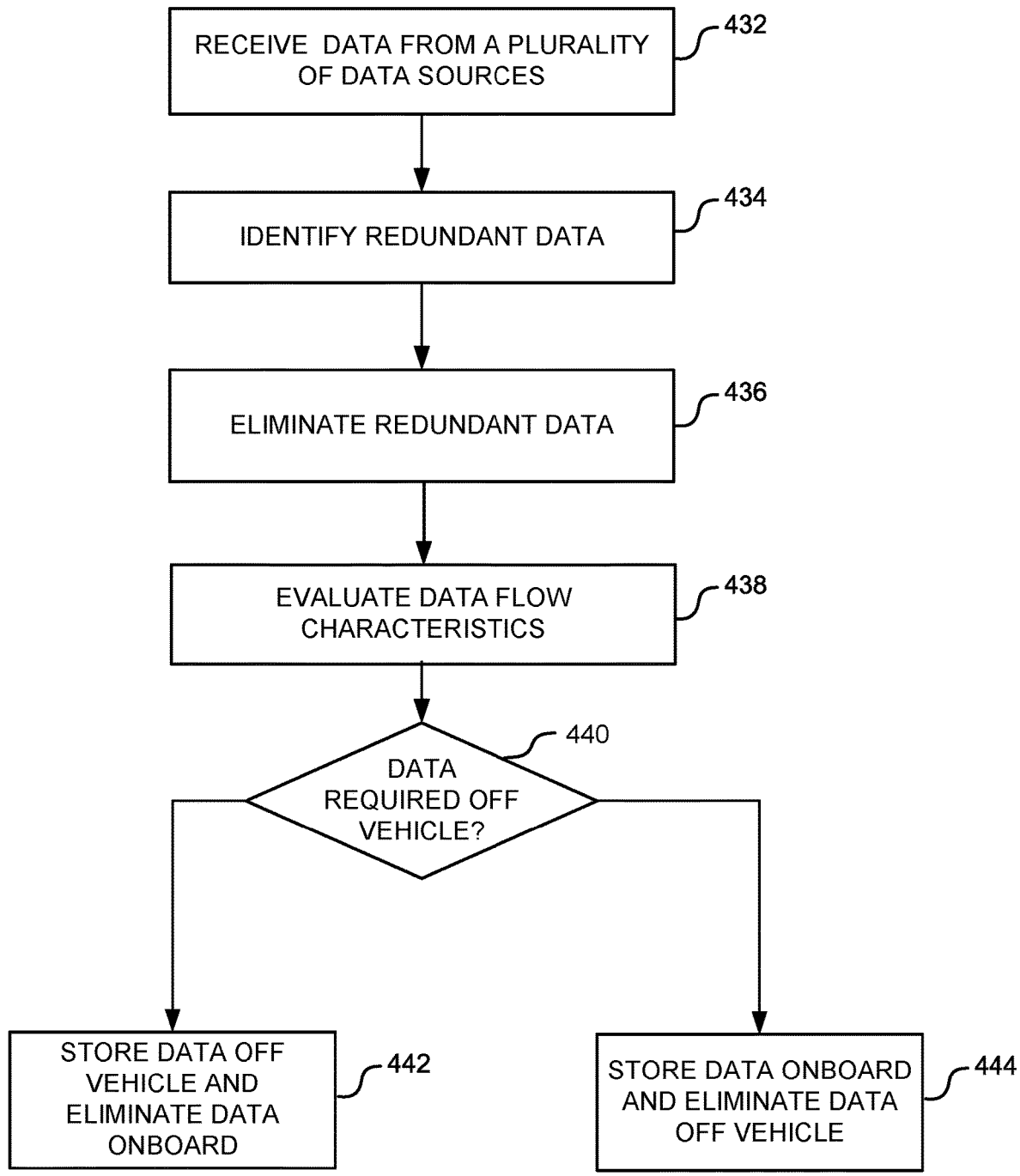
FIG. 5 illustrates an example process for addressing data redundancy in accordance with one embodiment

FIG. 5 illustrates an example process for addressing redundant data in accordance with one embodiment. Referring now to FIG. 5, at operation 432 system receives data from a priority of data sources. In terms of the example illustrated in FIG. 4, a data redundancy circuit 210 can receive data from sources such as vehicle sensors 152, vehicle systems 158 and external data sources 160. Sensors may gather and report data regarding their own states or the state of the environment or object around them At operation 434, the system evaluates the data received to determine whether redundant data has been received. As noted above, redundant data can include data items that are the same data received from multiple data sources. In other examples, redundant data might be different data items that each would lead to the same result. In various embodiments, the system can compare received data to data that is already existing or that it has already received to determine whether the newly received data is duplicative or redundant with current data. If so, the redundant data can be eliminated. This is illustrated at operation 436. In some applications, redundant data can be deleted, not stored, or stored but not retransmitted. In further applications, the source of the redundant data can be eliminated or turned off.

At operation 438, the system evaluates data flow characteristics to determine how and where otherwise redundant data items are being used. In some cases, and otherwise redundant data item might be collected by the subject vehicle, de-duplicated to remove redundancy and transmitted off the vehicle (e.g., to a cloud server) for processing, and that data might never be actually used by the subject vehicle itself. In this case, at operation 440 the system would determine that the data is required off the vehicle. The system would then determine at operation 442 to store the data off the vehicle and eliminate the data on board the vehicle. On the other hand, if the data is required on board the vehicle and not external to the vehicle, at operation 444, the system will store the data on board the vehicle and eliminate the data from storage locations external to the vehicle.

In various applications, the sensors measure a state (e.g., of themselves or their surroundings) and this information can be used to determine a state inference or estimation regarding a condition being evaluated. This inference might be noisy and probabilistic depending on the data gathered. Accordingly, not all available measurements are necessary to update the inference. Multiple measurements may be aggregated for an inference, allowing the system to turn off, disregard or timeshare at least some of those measurements. Accordingly, the system can be configured to aggregate the measurements and determine which measurements are needed to make an appropriate inference and what you might be disregarded.

In some applications, Bayesian inferences under Bayes law can be used to make this determination. For example, by looking at the contribution of a given measurement to the inference the system can determine how much a given data point will refine the inference. If the probability that data from a given sensor is small (e.g., below a determined threshold) data from that sensor might be disregarded. However, if data from a given sensor tends to affect the outcome of the inference, data from that sensor can be retained and used for the purposes for which it is collected.

As another example, artificial intelligence and machine learning can be used to determine which data sets to retain in which to disregard. A neural network can be trained and refined using the incoming measurements. Incoming measurements from the sensors can be received in this data changes the internal weights of the neural network. When the neural network stabilizes to the extent desired and additional data won't change the weights appreciably (e.g., certain inputs will change the outcome) this data can be disregarded.

Training of the neural network may be based on the use of labeled data. If two agents are each performing their own task and training their own neural network, there may be overlap in what they are accomplishing. For example, they may use the same image data from vehicle cameras as input to the training process and some subset of loan neural network for each agent may be transforming that input for its purposes. On the server-side, the server may receive aggregate streams from these different agents and can determine whether there is overlap that can be shared to eliminate redundancy. For example, the server can decompose the problem and identify common steps. As a further example, consider a crash avoidance tool that is scanning the environment for bicyclists and another that is scanning the environment for pedestrians. Both may be receiving the same image data (e.g., from a front-facing camera), but analyzing it for different purposes. However, in this circumstance, there is no need to send the image data twice (once for each task) as the image can be shared among the two tasks. Accordingly, where the information is used external to the vehicle such as at a cloud server, the system can determine that to transmit both sets of image data. Furthermore, in some implementations rather than transmitting the image data at all, the system may identify an intermediate image representation (e.g., a compressed image) and neural network structure that can be used to satisfy both tasks and reduce the bandwidth. This can be extended to other processing as well. In some embodiments, data from multiple sources can be processed into a single representation that can be used across multiple tasks. In both these examples, bandwidth might be conserved by sending an intermediate representation of data from one or more sources rather than sending the raw data from all sources.

Consider another example of a bus or shuttle. Passenger devices may be used to measure angular rates and accelerations and a GPS or other positioning system to aggregate and estimate of vehicle motion. This data can be ultimately aggregated to map suppliers or other parties looking to utilize this motion data. Rather than sending independent streams from each customer device to the third-party external to the bus, the system can determine a subset of data to gather and send. For example, in some situations data from only one or two or three passenger devices (rather than data from all passenger devices) can be used to obtain a sufficiently good estimate of vehicle motion. In this circumstance, the rest of the passenger devices can be commanded to go to an idle mode or to shut down that particular application to save power and to save communication bandwidth. The system can decide which devices to utilize and which to ignore or disable based on a number of factors including, for example, the quality of the data from each device, the frequency of updates from each device, the version of the application running on each device, and so on. The system (e.g., a data redundancy circuit 210 on the vehicle) can be configured to determine how many devices are on the vehicle, to select devices or data sets to use, to filter the results from these devices, and to send signals to unused devices to command them to cease operations. This example is not limited to devices on a bus or shuttle, but can be extended to devices across multiple vehicles in the same vicinity. Such a system can be used to create an impromptu platoon or group of vehicles to reduce the amount of data that is streamed to a server. Rather than having multiple vehicles independently streaming to the server, the vehicles can use V2V or other intra-vehicle communications to identify other vehicles in the same area performing the same functions. Vehicles can adjudicate amongst themselves which vehicle or vehicles may be used to aggregate and organize the data and to determine which vehicle's data to use.

As these examples illustrate, some embodiments can be implemented using state estimation in a probabilistic sense. Each state has a distribution and every measurement has the opportunity to alter that distribution to some extent. Some measurements may have a very small influence on that distribution (e.g., a low update power) while other measurements will have a large effect on the distribution (e.g., a high update power. Embodiments can be implemented to evaluate the update power or effect on the distribution and filter out or keep measurements based on this power. Depending on the criticality of the accuracy of the inference, the threshold can be drawn at different levels. Systems with higher accuracy requirements may allow more measurements through, including measurements that have a smaller impact on the distribution. On the other hand, tasks that require only a rough estimation of the state of something being measured may set a higher bar on the update power of the data that is passed through.

Figure 6:
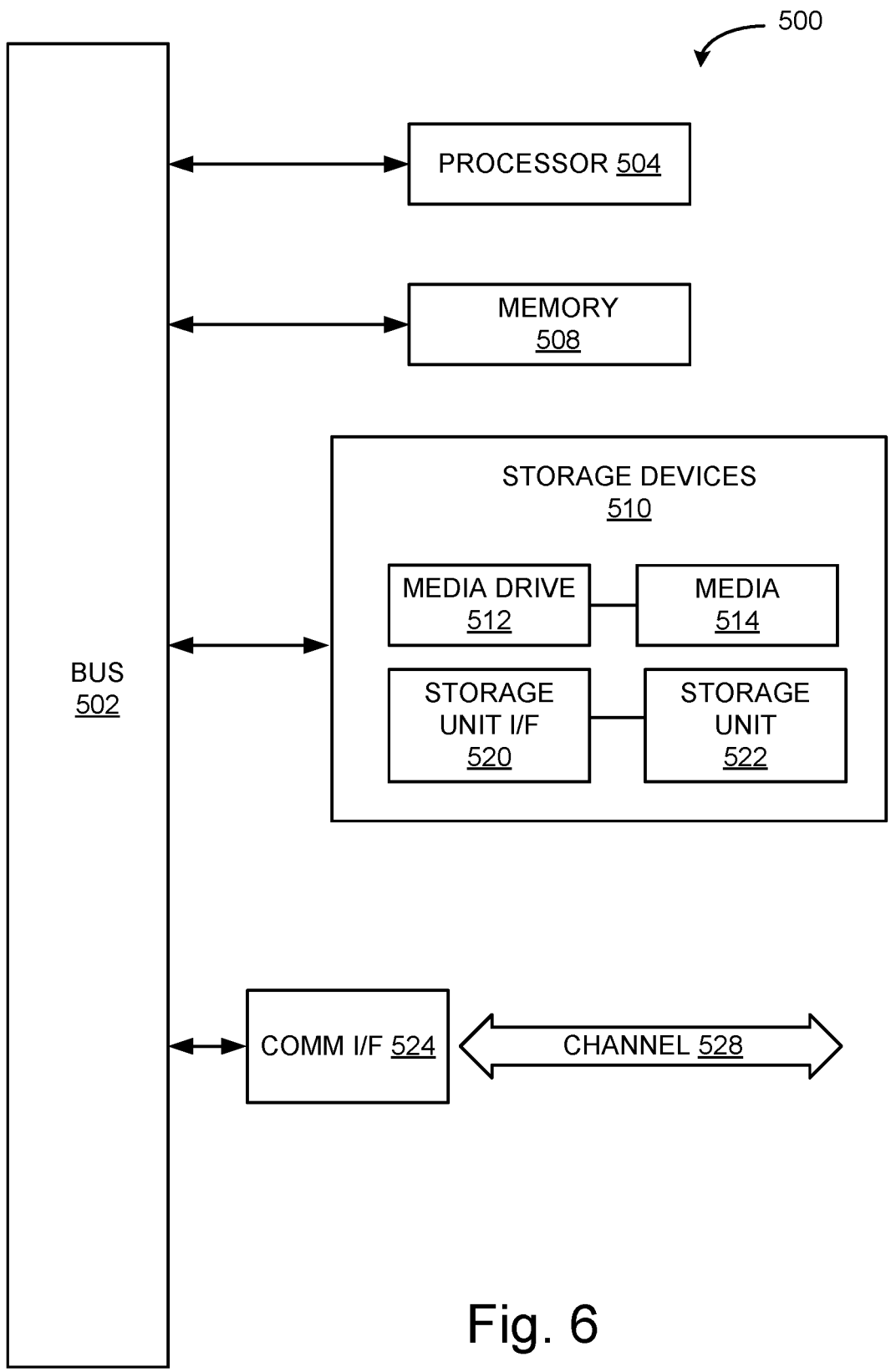
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 500. After reading this description, it will become apparent to a person skilled in the relevant art how to implement the application using other computing components or architectures.

Referring now to FIG. 6, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of data storage for a subject vehicle, comprising:
   receiving, at the subject vehicle, data items from a plurality of data sources;
   determining whether a received data item from one of the plurality of data sources is redundant with a stored data item of a data set already captured by the subject vehicle and stored in a storage device, wherein the data set comprises nonredundant data items;
   upon determining that the received data item is not redundant with any stored data items in the data set, storing the received data item in the data set in the storage device;
   upon determining that the received data item is redundant with the stored data item, avoiding storage of the received data item and keeping the stored data item in the storage device;
   cutting off, at the subject vehicle, communications with a source of the plurality of data sources of the received data item that is redundant with the stored data item;
   determining that a location where the received data item is predicted to be used for two or more tasks is external to the subject vehicle;
   identifying an intermediate image representation of the received data item and neural network structure that is used to satisfy the two or more tasks; and
   using the intermediate image representation and not the received data item for the two or more tasks to reduce communications bandwidth.

2. The method of claim 1, wherein determining the location is based on data flow characteristics of the data item, and wherein the data flow characteristics comprise a predicted flow of the data between a location at the subject vehicle and a plurality of locations external to the subject vehicle.

3. The method of claim 1, wherein the plurality of data sources comprise at least one of vehicle sensors of the subject vehicle, vehicle systems of the subject vehicle and external data sources.

4. The method of claim 1, wherein the stored data item is redundant with the received data item when the stored data item and the received data item contain same data.

5. The method of claim 1, wherein the stored data item is redundant with the received data item when the stored data item and the received data item contain different data that leads to a same conclusion.

6. The method of claim 1, wherein determining the location is based on data flow characteristics of the data item, and wherein the data flow characteristics comprise a second location where the data item is processed.

7. The method of claim 1, further comprising:
   based on the received data item or the stored data item, determining a change to a vehicle design.

8. The method of claim 1, further comprising:
   initiating an evaluation of data flow characteristics of the received data item and the stored data item, wherein the evaluation comprises determining whether the received data item has a higher probability than the stored data item of improving a state inference or estimation regarding a condition being evaluated.

9. The method of claim 1, wherein the plurality of data sources comprises at least one hybrid sensor that provides a combination of raw data and processed data.

10. The method of claim 1, wherein the storage device used in determining to store the data item of the data set off the subject vehicle comprises a cloud storage or the storage device provided by an external service provider.

11. The method of claim 1, further comprising:
   based on determining that the received data item is redundant with the stored data item, activating a flag associated with the stored data item.

12. The method of claim 1, wherein the location is determined to be external to the subject vehicle based on an evaluation of a data flow characteristic of the data items received from a plurality of subject vehicles, and wherein the data flow characteristic is associated with an originating vehicle sensor that generated the data items.

13. The method of claim 1, wherein the plurality of data sources comprise the subject vehicle, vehicle systems of the subject vehicle, and external data sources.

14. The method of claim 1, wherein the plurality of data sources comprise one or more sensors that provide only raw data to an electronic control unit of the subject vehicle.

15. The method of claim 1, wherein the subject vehicle comprises an internal combustion engine and one or more electric motors as sources of motive power.

16. A vehicular system for data storage for a subject vehicle, comprising:
   a processor; and
   a memory coupled to the processor to store instructions, which when executed by the processor, cause the processor to perform operations, the operations comprising:
      receiving, at the subject vehicle, data items from a plurality of data sources;
      determining whether a received data item from one of the plurality of data sources is redundant with a stored data item of a data set already captured by the subject vehicle and stored in a storage device, wherein the data set comprises nonredundant data items;
      upon determining that the received data item is not redundant with any stored data items in the data set, storing the received data item in the data set in the storage device;
      upon determining that the received data item is redundant with the stored data item avoiding storage of the received data item and keeping the stored data item in the storage device;
      cutting off communications with a source of the plurality of data sources of the received data item that is redundant with the stored data item;
      determining that a location where the received data item is predicted to be used for two or more tasks is external to the subject vehicle;
      identifying an intermediate image representation of the received data item and neural network structure that is used to satisfy the two or more tasks; and
      using the intermediate image representation and not the received data item for the two or more tasks to reduce communications bandwidth.

17. The vehicular system of claim 16, wherein determining the location is based on data flow characteristics of the data item, and wherein the data flow characteristics comprise a predicted flow of the data between a location at the subject vehicle and a plurality of locations external to the subject vehicle.

18. The vehicular system of claim 16, wherein the plurality of data sources comprise at least one of vehicle sensors of the subject vehicle, vehicle systems of the subject vehicle and external data sources.

19. The vehicular system of claim 16, wherein the stored data item is redundant with the received data item when the stored data item and the received data item contain same data.

20. The vehicular system of claim 16, wherein the stored data item is redundant with the received data item when the stored data item and the received data item contain different data that leads to a same conclusion.

* * * * *